Patented May 25, 1943

2,319,852

UNITED STATES PATENT OFFICE 2,319,852

COATING COMPOSITION

Arthur K. Doolittle, South Charleston, W. Va., assignor to Carbide and Carbon Chemicals Corporation, a corporation of New York No Drawing. Application February 2, 1939, Serial No. 254,227

12 Claims. (Cl. 260—32)

This invention is directed to an improvement in coating compositions containing vinyl resins as the essential coating ingredients.

Coating compositions comprising vinyl resins dissolved or dispersed in solvents or solvent-diluent mixtures and modified, if desired, by the presence of pigments and plasticizers are already well known in the lacquer and coatings industry. Such compositions are characterized by somewhat unusual physical properties which limit to some extent the amount of vinyl resin which can be dissolved or dispersed in the compositions. For instance, as the amount of vinyl resin dissolved or dispersed in a particular solvent or solvent-diluent mixture is increased, the viscosity of the composition rapidly increases and a point is reached at which the composition exhibits the property of thixotropism. That is, the composition possesses a non-stable, more or less rigid structure. This structure can be broken down by mechanical agitation, the viscosity lowered, and the solution made to approach true viscous flow. Upon standing, the structure reforms and the viscosity rises again. As the amount of vinyl resin is further increased, the composition finally becomes a gel, that is, it becomes immobilized so that it will not flow under its own weight when inverted.

For convenience, therefore, combinations of vinyl resins with solvents or solvent-diluent mixtures may be divided into three classes: those which form fluid solutions, those which form thixotropic solutions, and those which form gels. Obviously, the class in which any given combination will fall will be dependent on other factors besides the ratio of vinyl resin to the solvent or solvent-diluent mixture. Among such determining factors are the temperature, the particular solvent or solvent-diluent mixture used, the macromolecular weight of the vinyl resin, and, in the case of solvent-diluent mixtures, the ratio of solvent to diluent in the mixture.

For various reasons, the principal one being economy, it is desirable for many purposes that the ratio of vinyl resin in the coating composition relative to the solvents or solvent-diluent mixture used be as high as is possible. However, this ratio must be adjusted and the other determining factors controlled so that the viscosity of the composition is not too great for satisfactory application of the coating composition. This has resulted, practically speaking, in the restriction heretofore of vinyl resin coating compositions to those comprising fluid solutions of the vinyl resin in the solvent or solvent-diluent mixture.

In the copending United States application, Serial No. 212,288, of C. O. Strother, now Patent No. 2,238,956, a method for formulating vinyl resin coating compositions having ratios of vinyl resin to solvent or solvent-diluent mixture which may correspond to those encountered in the thixotropic region is given. This method comprises forming an appropriate emulsion of the thixotropic composition in water.

The principal object of this invention is to provide coating compositions containing vinyl resins in which the vinyl resin is combined with certain solvents and solvent-diluent mixtures in such proportions as to form gels at ordinary temperatures and yet provide coating compositions sufficiently fluid for satisfactory application.

The coating composition of this invention comprises minute gel particles consisting of vinyl resins combined colloidally with certain organic liquids, to be described later, the particles being suspended in water containing an emulsifying agent.

Throughout the description of this invention and in the appended claims, the term "suspension" will be understood to designate an intimate dispersion of finely-divided solid particles in a liquid, whereas the term "emulsion" will be applied only to intimate dispersions of finely-divided liquid droplets in another liquid.

To prepare the coating composition of this invention, it has been found that the use of an appropriate organic liquid to be combined colloidally with the vinyl resins to form the suspended gel particles is of primary importance. This liquid must be selected from the following classes: First, those liquids which are solvents for the vinyl resin at elevated temperatures and at the same time are substantially non-solvents, or at least exert no more than a partial solvent action for the vinyl resin, at ordinary temperatures. Second, mixtures of the foregoing liquids with active solvents for the vinyl resin, such as the ketone solvents. However, in this case, the proportions of the mixture must be adjusted to the ratio of the vinyl resin combined with the mixture, and the other determining factors must be controlled, so that the combination formed is a gel at ordinary temperatures and a fluid or thixotropic solution at elevated temperatures. Furthermore, it is essential that the solubility of water at elevated temperatures of around 90° C. in the organic liquid used, notwithstanding from which of the foregoing classes it is selected, be a minimum. The extent and importance of this latter restriction will be more fully explained later. Finally, it is preferable that the organic liquid be at least somewhat volatile so that its removal from the applied coating composition may be facilitated.

The coating composition may be prepared by dissolving the vinyl resin in a suitable organic liquid, as defined above, at an elevated temperature to form a fluid or thixotropic solution. The temperature used should preferably be below the boiling point of the organic liquid. This hot solution is agitated with hot water containing an emulsifying agent, and an "oil-in-water" type emulsion is formed. On cooling the emulsion, the dispersed solution phase gels and the nature of the composition changes to a stable suspension of minute gel particles of vinyl resin colloidally combined with the organic liquid. Plasticizers may be incorporated in the coating composition, if desired, and are preferably added by inclusion with the organic liquid used to dissolve the vinyl resins at the elevated temperatures.

The coating composition of this invention is particularly adapted for coating fibrous materials. It may be used to coat paper to render it impervious and waterproof. It has proved very successful in sizing and stiffening textiles, being very useful as a binder in backing carpets and rugs. In such applications, the use of the new coating composition is accompanied by marked advantages as compared with lacquer emulsions or lacquer solutions of the coating material. For instance, the gel suspension serves principally to deposit the vinyl resin at the surface of the fibers only, whereas with the latter compositions, penetration into the fibers may result since the lacquers or oil phase of the emulsions are fluid or mobile and therefore can flow.

A further advantage of the gel suspensions, as compared with the lacquer emulsions, is the greater stability of the former for a given particle size. For instance, the particle size of the gel suspension may be as high as 50 microns and yet the suspension remains stable, whereas lacquer emulsions having an appreciable number of dispersed liquid droplets of this diameter are unstable. As a result of this, less agitation is required in forming the gel suspensions.

Additionally, the greater stability of the gel suspensions for a given particle size permits, in a given piece of emulsifying equipment, the preparation of gel suspensions with a higher solids content in the dispersed phase than is true of emulsions. This follows from the fact that the stability of either emulsions or suspensions depends primarily on the particle size of the dispersed droplets or particles, and from the fact that the particle size obtainable with any given piece of emulsifying equipment is dependent upon the viscosity of the liquid being emulsified. Thus, in preparing the gel suspensions, higher solids content can be employed in the hot solution being dispersed and yet, as a consequence of the heating, the hot solution may have a reduced viscosity which will permit emulsifying the hot solution to a smaller particle size in the emulsifying equipment. Alternatively, if the solids content employed is increased greatly so that the viscosity of the hot solution being dispersed, in the case of the gel suspensions, notwithstanding the higher temperature, is greater than the viscosity of the solution being emulsified at ordinary temperatures, in the case of the emulsions, the gel suspension prepared will be sufficiently stable, even though it may have a larger particle size.

Finally, the element of cost is decidedly in favor of the gel suspension since the disperse phase of the gel suspension has a higher solids content and thus less volatile solvent is required to deposit a given weight of resin from the gel suspension than is true of a composition made with a more dilute vinyl resin solution or emulsion. Furthermore, the aromatic hydrocarbon solvents preferred for use in this invention are considerably less expensive than the ketone solvents, substantial proportions of which have heretofore been required in coating compositions containing vinyl resins.

The vinyl resins to which this invention is particularly applicable are those which may be formed by the conjoint polymerization of vinyl halides, such as vinyl chloride or vinyl bromide, with vinyl esters of the lower aliphatic acids, such as acetic, propionic, butyric, and like acids. Especially desirable are those vinyl resins made by the conjoint polymerization of vinyl chloride with vinyl acetate having a vinyl chloride content in the polymer of from 60% to 95% and an average molecular weight of about 5000 to 15,000. Of this range, resins having about 87% vinyl chloride and an average molecular weight of about 10,000 are preferred. The molecular weights referred to above are those determined by Staudinger's method from the viscosity of dilute solutions of the resins.

The choice of a suitable liquid to use in making gel suspensions with this preferred vinyl resin will be dependent on the factors enumerated before. The importance and extent of the restriction on the solubility of water in the organic liquid at the elevated temperatures involved in one of the steps in making the gel suspension can be more clearly illustrated by several examples.

*Example 1*

The following solutions were prepared at 92° C. and emulsified at that temperature with equal agitation in water containing 2% by weight of a sodium alkyl naphthalene sulfonate, known by the trade name "Alkanol B." The proportions were 80% solution or gel phase and 20% water phase.

| Sample No. | 1 | 2 | 3 | 4 |
| --- | --- | --- | --- | --- |
|  | Per cent | Per cent | Per cent | Per cent |
| Vinyl resin | 40 | 40 | 40 | 40 |
| Dibutyl phthalate | 8 | 8 | 8 | 8 |
| Methyl isobutyl ketone | 26 |  |  |  |
| Methyl n-amyl ketone |  | 26 |  | 52 |
| Toluene | 26 | 26 | 52 |  |
|  | 100 | 100 | 100 | 100 |

Upon cooling, Samples Nos. 1 and 4 rapidly coalesced and formed a solid composition. Samples Nos. 2 and 3, upon cooling, formed stable and flowable suspensions of gel particles.

Similar experiments were made in which mixtures of methyl ethyl ketone and toluene were used as the solvent. In this case, the emulsifying temperature was kept below 78.5° C., the boiling point of methyl ethyl ketone. In these experiments also, coalescence of the dispersed phase occurred rapidly on cooling.

These results are believed to be due to the solubility of water in the solution or gel phase at the emulsifying temperature. It is believed that this solubility is a contributing factor in determining the stability of the suspension. It is probable that the presence of an excess amount of water in the solution or gel phase during the emulsification causes the emulsion to be unstable and to coalesce on cooling rather than to form a stable suspension of gel particles. The following data represent the respective solubilities of water in the ketone solvents at different temperatures.

| Solvent | Solubility of water in solvent (percent by weight). | | |
|---|---|---|---|
| | 30° C. | 40° C. | 85° C. |
| Methyl ethyl ketone | 12.2 | 12.7 | 22.0 |
| Methyl isobutyl ketone | 3.08 | 3.27 | 4.9 |
| Methyl n-amyl ketone | 1.64 | 1.86 | 3.17 |

For this reason, as well as those previously discussed, the selection of a suitable solvent to use in the gel phase of the suspension is of greatest importance in the practice of this invention. In general, the liquid aromatic hydrocarbons, such as benzene, toluene, xylene, styrene or hydrogenated naphthalenes, such as tetrahydro naphthalene, are suitable liquids because they are solvents for the vinyl resin at elevated temperatures and non-solvents or, at most, partial solvents for the vinyl resin at ordinary temperatures, and because they are substantially water-immiscible. Other suitable solvents, when used in proportions to form gels with the vinyl resins at ordinary temperatures and fluid solutions at elevated temperatures, are water-immiscible high-boiling esters, such as dibutyl phthalate, and water-immiscible halogenated hydrocarbons, such as ethylene dichloride. Mixtures of these solvents with the relatively water-miscible ketone solvents may be used provided that the solubility of water in the mixture at the emulsifying temperature is not so great as to cause instability.

*Example 2*

This example illustrates the preparation of a gel suspension which has proved very satisfactory for many coating applications. In this example, a plasticizer is incorporated with the vinyl resin to provide increased flexibility in the applied coating.

The following compositions were prepared:

| Gel phase | Water phase |
|---|---|
| Parts by weight | Parts |
| Vinyl resin 40.0 | Water 98 |
| Dibutyl phthalate 8.0 | "Alkanol B" (sodium alkyl naphthalene sulfonate) 2 |
| Toluene 52.0 | |

The gel phase was heated to a temperature of 90° to 100° C. and a fluid homogeneous solution obtained at this temperature. This solution was emulsified at this temperature with the water solution of the emulsifying agent in the proportions of 80 parts by weight of the gel phase to 20 parts of the water phase. An "oil-in-water" emulsion was formed and, on cooling this emulsion, a stable suspension of gel particles was produced.

Different proportions of the gel phase to water phase may, of course, be used and a ratio of 75 parts of the above gel phase to 25 parts of water phase was found equally satisfactory. It is, of course, necessary that sufficient water be used to provide a continuous phase for the hot emulsion and resulting gel suspension. Many other emulsifying agents, such as morpholine oleate, sodium tetradecyl sulfate, and sodium heptadecyl sulfate, may be used in the practice of the invention.

The gel suspensions produced may be diluted with water if desired. With or without dilution, they are useful in many coating applications. Upon applying the gel suspension to fibrous materials, for example, the suspension flows out freely over the surface and, upon evaporation of the water and the toluene at a slightly elevated temperature, a uniform plasticized vinyl resin coating is deposited on the surface. Because the gel phase of the suspension is immobile, very little impregnation of the fibers results, the coating being deposited mostly on the surface.

*Example 3*

In the course of experiments similar to those referred to above, in which the toluene gel suspension of Example 2 was applied as a backing to rugs and carpets, it was observed that the films of vinyl resin deposited on the rugs did not possess adequate mechanical strength after the rugs were shampooed at temperatures of about 130° F. Investigation of this difficulty revealed that residual amounts of inorganic salts, such as sodium sulfate, present in the emulsifying agent and consequently deposited in the applied film, were the cause of the reduced film strengths. When the emulsifying agent was purified, so as to remove any inorganic salts, it was found that the films of vinyl resin deposited as a rug backing, possessed adequate film strength after the rugs were shampooed.

The following gel suspensions were produced by following the procedure outlined in Example 2. In each case a stable suspension was produced. The gel suspensions illustrated are adapted for different uses depending primarily on the volatility of the solvents comprising the gel phase.

*Example 4*

| Gel phase—80% by weight | Water phase—20% by weight |
|---|---|
| Per cent by weight | Per cent by weight |
| Vinyl resin 40 | "Alkanol B" 2 |
| Toluene 60 | Water 98 |

*Example 5*

| Gel phase—80% by weight | Water phase—20% by weight |
|---|---|
| Per cent by weight | Per cent by weight |
| Vinyl resin 35 | Sodium hepta-decyl sulfate 3.4 |
| Dibutyl phthalate 7 | Water 96.6 |
| Toluene 58 | |

*Example 6*

| Gel phase—80% by weight | Water phase—20% by weight |
|---|---|
| Per cent by weight | Per cent by weight |
| Vinyl resin 40 | "Alkanol B" 2 |
| Tetrahydro naphthalene 60 | Water 98 |

*Example 7*

| Gel phase—80% by weight | Water phase—20% by weight |
|---|---|
| Per cent by weight | Per cent by weight |
| Vinyl resin 40 | "Alkanol B" 2 |
| Methyl n-amyl ketone 30 | Water 98 |
| Toluene 30 | |

Example 8

| Gel phase—80% by weight | | Water phase—20% by weight | |
| --- | --- | --- | --- |
| | Per cent by weight | | Per cent by weight |
| Vinyl resin | 35 | "Alkanol B" | 2 |
| Dibutyl phthalate | 7 | Water | 98 |
| Methyl n-amyl ketone | 29 | | |
| Toluene | 29 | | |

Example 9

| Gel phase—80% by weight | | Water phase—20% by weight | |
| --- | --- | --- | --- |
| | Per cent by weight | | Per cent by weight |
| Vinyl resin | 20 | Sodium heptadecyl sulfate | 5.3 |
| Dibutyl phthalate | 80 | Water | 94.7 |

Modifications of the invention other than as disclosed will be readily apparent to those skilled in the art and are included within the scope of the invention as defined by the appended claims.

I claim:

1. A coating composition comprising a stable suspension of minute particles of a gel in water containing an emulsifying agent, said gel being immobile on mechanical agitation and being composed of a colloidal combination of a vinyl resin with a substantially water-immiscible organic liquid composition which is a solvent for said vinyl resin at elevated temperatures below its boiling point and which has at most no greater solvent action for said resin at ordinary temperatures than a partial solvent, the amounts of said vinyl resin and said organic liquid composition being so proportioned that said colloidal combination is fluid at said elevated temperatures and substantially immobile at said ordinary temperatures, said vinyl resin being a conjoint polymer of a vinyl halide with a vinyl ester of an aliphatic acid.

2. A coating composition comprising a stable suspension of minute particles of a gel in water containing an emulsifying agent, said gel being immobile on mechanical agitation and being composed of a colloidal combination of a vinyl resin with a substantially water-immiscible organic liquid composition which is a solvent for said vinyl resin at elevated temperatures below its boiling point and which has at most no greater solvent action for said resin at ordinary temperatures than a partial solvent, the amounts of said vinyl resin and said organic liquid composition being proportioned between about 20 to 40 parts of the vinyl resin to about 60 to 80 parts of the organic liquid composition, said vinyl resin being a conjoint polymer of a vinyl halide with a vinyl ester of an aliphatic acid.

3. A coating composition comprising a stable suspension of minute particles of a gel in water containing an emulsifying agent, said gel being immobile on mechanical agitation and being composed of a colloidal combination of a vinyl resin with a liquid aromatic hydrocarbon and a plasticizer, said vinyl resin being a conjoint polymer of vinyl chloride with a vinyl ester of an aliphatic acid containing about 60% to 95% vinyl chloride in the polymer.

4. A coating composition comprising a stable suspension of minute particles of a gel in water containing an emulsifying agent, said gel being immobile on mechanical agitation and being composed of a colloidal combination of a vinyl resin with an organic liquid composition composed of an aliphatic ketone and an aromatic hydrocarbon, the amounts of said ketone and said aromatic hydrocarbon being so proportioned to the vinyl resin that said liquid composition will form a fluid solution with said vinyl resin at elevated temperatures below its boiling point and will form an immobile gel with said resin at ordinary temperatures, and being further so proportioned that said liquid composition is substantially immiscible with water at said elevated temperatures, said vinyl resin being a conjoint polymer of vinyl chloride with a vinyl ester of an aliphatic acid.

5. A coating composition comprising minute particles of a gel immobile on mechanical agitation and being composed of a conjoint polymer of vinyl chloride with vinyl acetate containing about 60% to 95% vinyl chloride in the polymer, combined colloidally with toluene and a plasticizer, said gel particles being stably suspended in water containing an emulsifying agent.

6. Process for making a coating composition which comprises dissolving a conjoint polymer of a vinyl halide with a vinyl ester of an aliphatic acid at an elevated temperature in a water-immiscible, organic liquid composition which is a solvent for said vinyl resin at elevated temperatures below its boiling point and which has no greater solvent action for said resin at ordinary temperatures than a partial solvent, the amounts of said vinyl resin and said organic liquid composition being so proportioned that the combination thereof is fluid at said elevated temperatures and substantially immobile at said ordinary temperatures; and thereafter emulsifying the hot solution of the vinyl resin in water containing an emulsifying agent and forming an emulsion in which said solution is the disperse phase; cooling the emulsion and causing the disperse phase to gel without coalescence, and forming a stable suspension in water of particles of a gel which is immobile on mechanical agitation and which is composed of said vinyl resin colloidally combined with said organic liquid composition.

7. Process for making a coating composition which comprises dissolving at an elevated temperature a conjoint polymer of a vinyl halide with a vinyl ester of a lower aliphatic acid in an organic liquid composition comprising a volatile ketone and a volatile aromatic hydrocarbon, said composition being characterized by limited solubility of water therein at said elevated temperatures and being proportioned to form a fluid solution with said resin at elevated temperatures below the boiling point of said liquid composition and a gel with said resin at ordinary temperatures; emulsifying said solution while hot in water containing an emulsifying agent and forming an emulsion in which said solution is the disperse phase, cooling the emulsion and causing the disperse phase to gel without coalescence, and forming a stable suspension in water of particles of a gel which is immobile on mechanical agitation and which is composed of said vinyl resin colloidally combined with said organic liquid composition.

8. Process for making a coating composition which comprises dissolving at an elevated temperature a conjoint polymer of vinyl chloride with vinyl acetate containing about 60% to 95% vinyl chloride in the polymer, in a mixture of a liquid aromatic hydrocarbon and a plasticizer; emulsifying the hot solution thus formed in water containing an emulsifying agent and forming an emulsion in which said solution is the disperse phase, cooling the emulsion and causing the disperse phase to gel without coalescence, and forming a stable suspension in water of particles of a gel which is immobile on mechanical agitation and which is composed of said vinyl resin colloidally combined with said aromatic hydrocarbon and said plasticizer.

9. Process for making a coating composition which comprises dissolving a conjoint polymer of vinyl chloride with vinyl acetate containing about 60% to 95% vinyl chloride in the polymer, in toluene at an elevated temperature, emulsifying the hot solution thus formed in water containing an emulsifying agent, forming an emulsion in which said solution is the disperse phase, cooling the emulsion and causing the disperse phase to gel without coalescence, and forming a stable suspension in water of particles of a gel which is immobile on mechanical agitation and which is composed of said vinyl resin colloidally combined with toluene.

10. Process for coating fibrous materials and causing limited impregnation of the fibers which comprises applying to said materials a coating composition comprising a stable suspension in water containing an emulsifying agent, of minute particles of a gel which is immobile on mechanical agitation and which is composed of a conjoint polymer of a vinyl halide with a vinyl ester of a lower aliphatic acid in colloidal combination with an essentially volatile substantially water-immiscible organic liquid composition which is a solvent for said vinyl resin at elevated temperatures and which has at most no greater solvent action for said resin at ordinary temperatures than a partial solvent, the amounts of said vinyl resin and said organic liquid composition being so proportioned that said colloidal combination is fluid at said elevated temperatures and substantially immobile at said ordinary temperatures, removing the water and volatile portion of the organic liquid from the applied composition; and forming a substantially continuous film of vinyl resin primarily on the surface of said fibrous material.

11. Process for coating fibrous materials and causing limited impregnation of the fibers which comprises applying to said materials a coating composition comprising minute particles of a gel which is immobile on mechanical agitation and which is composed of a conjoint polymer of vinyl chloride with vinyl acetate containing about 60% to 95% vinyl chloride in the polymer, combined colloidally with toluene and a plasticizer, said gel particles being stably suspended in water containing an emulsifying agent; removing the water and toluene from the applied composition; and forming a substantially continuous film of said vinyl resin primarily on the surface of said fibrous material.

12. Process for coating fibrous materials which comprises applying to said materials a coating composition comprising minute particles of a gel which is immobile on mechanical agitation and which is composed of a conjoint polymer of vinyl chloride with vinyl acetate containing about 87% vinyl chloride in the polymer, combined colloidally with toluene and a plasticizer, said gel particles being stably suspended in water containing sodium alkyl naphthalene sulfonate as an emulsifying agent, said sodium alkyl naphthalene sulfonate being substantially free from inorganic salts; removing the water and toluene from the applied composition; and forming a substantially continuous film of said vinyl resin primarily on the surface of said fibrous material, said film being adapted to resist the action of hot water.

ARTHUR K. DOOLITTLE.